United States Patent
Sasaki et al.

(10) Patent No.: US 9,695,879 B2
(45) Date of Patent: Jul. 4, 2017

(54) GUIDE MECHANISM FOR CONNECTING COMPONENT, AND COUPLING STRUCTURE AND PROCESSING APPARATUS USING THE GUIDE MECHANISM

(71) Applicant: FUJI XEROX CO., LTD., Tokyo (JP)

(72) Inventors: Toshinori Sasaki, Kanagawa (JP); Koichi Kimura, Kanagawa (JP); Mizuki Sugino, Kanagawa (JP); Mitsutoshi Hongo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/840,553

(22) Filed: Aug. 31, 2015

(65) Prior Publication Data

US 2016/0258490 A1 Sep. 8, 2016

(30) Foreign Application Priority Data

Mar. 4, 2015 (JP) ................................. 2015-042538

(51) Int. Cl.
  *G03G 21/16* (2006.01)
  *F16D 1/12* (2006.01)
  (Continued)

(52) U.S. Cl.
  CPC ................. *F16D 1/12* (2013.01); *F16D 1/10* (2013.01); *G03G 15/80* (2013.01);
  (Continued)

(58) Field of Classification Search
  CPC .. F16D 1/12; F16D 1/10; F16D 1/101; G03G 15/80; G03G 21/1652; G03G 2221/166;
  (Continued)

(56) References Cited

U.S. PATENT DOCUMENTS

| 5,211,566 | A | * | 5/1993 | Bates | G11B 33/122 361/679.41 |
| 5,764,476 | A | * | 6/1998 | Ohgami | G06F 1/1616 361/679.27 |
| 5,815,479 | A | * | 9/1998 | Lee | G11B 33/027 720/647 |
| 2004/0131380 | A1 | * | 7/2004 | Kuma | G03G 15/5004 399/90 |
| 2006/0250778 | A1 | * | 11/2006 | Yamamoto | G06K 7/0043 361/737 |

(Continued)

FOREIGN PATENT DOCUMENTS

| JP | 2010-61983 A | 3/2010 |
| JP | 2012-76333 A | 4/2012 |
| JP | 2012-226295 A | 11/2012 |

*Primary Examiner* — Sevan A Aydin
(74) *Attorney, Agent, or Firm* — Sughrue Mion, PLLC (57) ABSTRACT

A guide mechanism for a connecting component guides a second connecting component when connecting a first connecting component and the second connecting component to each other. The guide mechanism includes a guide member and an urging member. The urging member urges the guide member and continues to contract until the second connecting component reaches a connection complete position. The guide member includes rotational shafts, inner guide pieces, and outer guide pieces. The rotational shafts are provided on both sides of the second connecting component. The inner guide pieces are rotated about the rotational shafts from first initial positions to first regulating positions. The outer guide pieces are rotated about the rotational shafts from second initial positions to second regulating positions such that the rotation of the outer guide pieces is coupled with the rotation of the inner guide pieces.

9 Claims, 8 Drawing Sheets

(51) Int. Cl.
*F16D 1/10* (2006.01)
*G03G 15/00* (2006.01)
*G03G 21/18* (2006.01)

(52) U.S. Cl.
CPC ..... *G03G 21/1652* (2013.01); *G03G 21/1867* (2013.01); *G03G 2215/0129* (2013.01); *G03G 2221/1684* (2013.01)

(58) Field of Classification Search
CPC .............. G03G 21/1821; Y10T 403/60; Y10T 403/608; Y10T 403/7039; Y10T 403/1616; Y10T 403/1624; F16B 7/04; F16B 2001/0092; F16B 7/0406; F16B 2/10; F16B 7/22
USPC ......................... 464/901; 403/13, 14; 33/412
See application file for complete search history.

(56) References Cited

U.S. PATENT DOCUMENTS

| | | | | |
|---|---|---|---|---|
| 2008/0178641 | A1* | 7/2008 | Himmen | F16B 2/10 70/57 |
| 2012/0162872 | A1* | 6/2012 | Liang | H05K 5/0239 361/679.01 |
| 2013/0288504 | A1* | 10/2013 | Sass | H01R 12/7029 439/328 |
| 2015/0037060 | A1* | 2/2015 | Hamaya | G03G 15/80 399/90 |
| 2015/0043937 | A1* | 2/2015 | Choi | G03G 21/1867 399/90 |
| 2015/0139680 | A1* | 5/2015 | Moriya | G03G 21/1652 399/90 |

\* cited by examiner

GUIDE MECHANISM FOR CONNECTING COMPONENT, AND COUPLING STRUCTURE AND PROCESSING APPARATUS USING THE GUIDE MECHANISM

CROSS-REFERENCE TO RELATED APPLICATIONS

This application is based on and claims priority under 35 USC 119 from Japanese Patent Application No. 2015-042538 filed Mar. 4, 2015.

BACKGROUND (i) Technical Field

The present invention relates to a guide mechanism for a connecting component, and a coupling structure and a processing apparatus that use the guide mechanism.

(ii) Related Art

There are related-art coupling structures for detachable connectors for electrical wiring used in, for example, image forming apparatuses and peripheral equipment for the image forming apparatuses.

SUMMARY

According to an aspect of the present invention, a guide mechanism for a connecting component guides a second connecting component to a position where the second connecting component is connectable to a first connecting component when connecting the first connecting component provided in a first support member in a secured manner and the second connecting component floatably provided in a second support member to each other. The guide mechanism includes a guide member and an urging member. The guide member is disposed in front of a connection start position of the first connecting component. The urging member is elastically deformably provided between the guide member and the first support member, urges the guide member in a direction separating from the first connecting component so as to dispose the guide member in front of the connection start position, and continues to contract until the second connecting component reaches a connection complete position. The guide member includes at least a pair of rotational shafts, inner guide pieces, and outer guide pieces. The at least a pair of rotational shafts are provided on both sides of the second connecting component in a direction intersecting a connecting direction of the second connecting component. The inner guide pieces have respective rotational free ends, extend in radial directions of the at least a pair of rotational shafts such that the rotational free ends face each other, are held at first initial positions at which the rotational free ends of the inner guide pieces are positioned further to a second connecting component side than at first regulating positions in the connecting direction of the second connecting component, and are rotated about the at least a pair of rotational shafts from the first initial positions to the first regulating positions in the connecting direction when the inner guide pieces are brought into contact with the second connecting component. The outer guide pieces have respective rotational free ends, extend in the radial directions of the at least a pair of rotational shafts, are held at second initial positions at which the rotational free ends of the outer guide pieces are positioned further to outer sides than at second regulating positions in an intersecting direction intersecting the connecting direction of the second connecting component, and are rotated about the at least a pair of rotational shafts from the second initial positions to the second regulating positions in the intersecting direction such that the rotation of the outer guide pieces is coupled with the rotation of the inner guide pieces.

BRIEF DESCRIPTION OF THE DRAWINGS

Exemplary embodiment of the present invention will be described in detail based on the following figures, wherein:

FIGS. 1A and 1B are explanatory views of an outline of an exemplary embodiment of a coupling structure for a connecting component to which an exemplary embodiment of the present invention is applied, and out of FIGS. 1A and 1B, FIG. 1A illustrates a state before coupling, and FIG. 1B illustrates a state after the coupling;

FIGS. 6A to 6C are explanatory views of changes in a connecting operation, and out of FIGS. 6A to 6C, FIG. 6A illustrates a stage before the drawable connector is brought into contact with the guide member before connection, FIG. 6B illustrates a stage at which the drawable connector is brought into contact with the guide member, and FIG. 6C illustrates a stage at which the drawable connector is connected to a body connector;

DETAILED DESCRIPTION

An Outline of an Exemplary Embodiment

Figure 1A:
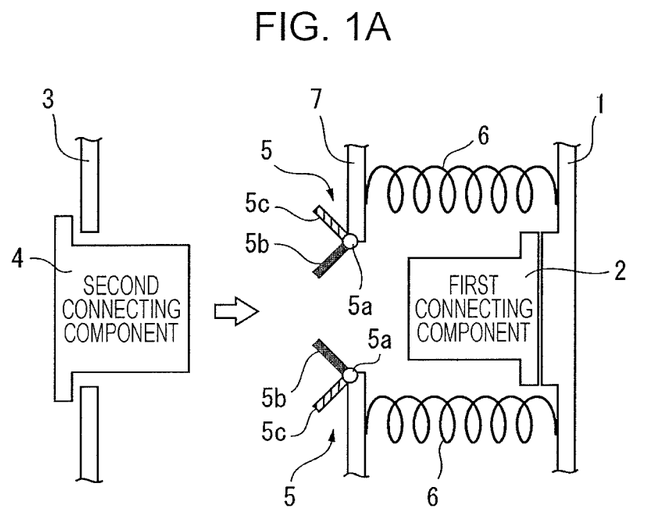
Figure 1B:
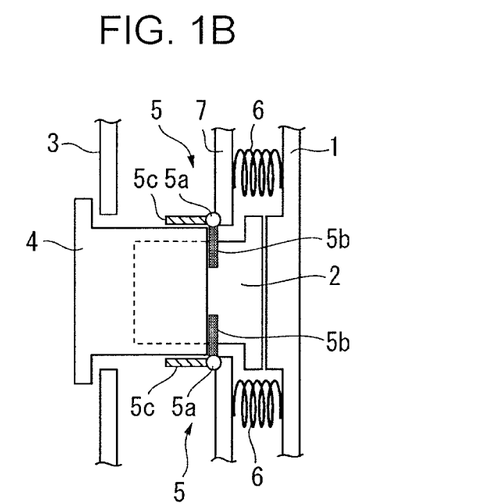

FIGS. 1A and 1B are explanatory views of an outline of an exemplary embodiment of a coupling structure for a connecting component according to an exemplary embodiment of the present invention. Specifically, FIG. 1A illustrates an initial state before coupling, and FIG. 1B illustrates a state after the coupling.

Referring to FIGS. 1A and 1B, the coupling structure according to a present form includes a first connecting component 2, a second connecting component 4, and a guide mechanism. The first connecting component 2 is provided in a first support member 1 in a secured manner. The second connecting component 4 is floatably provided in a second support member 3. The guide mechanism guides the second connecting component 4 to a position where the second connecting component 4 is connectable to the first connecting component 2.

This guide mechanism for a connecting component guides the second connecting component 4 to a position where the second connecting component 4 is connectable to the first connecting component 2 when connecting the first connecting component 2 provided in the first support member 1 in a secured manner and the second connecting component 4 floatably provided in the second support member 3 to each other. The guide mechanism includes a guide member 5 and urging members 6. The guide member 5 is disposed in front of a connection start position of the first connecting component 2. The urging members 6 are elastically deformably provided between the guide member 5 and the first support member 1, urge the guide member 5 in a direction separating from the first connecting component 2 so as to dispose the guide member 5 in front of the connection start position, and continue to contract until the second connecting component 4 reaches a connection complete position. The guide member 5 includes rotational shafts 5a, inner guide pieces 5b, and outer guide pieces 5c. At least a pair of rotational shafts 5a are provided on both sides of the second connecting component 4 in a direction intersecting a connecting direction of the second connecting component 4. The inner guide pieces 5b have respective rotational free ends and extend in radial directions of the pair of rotational shafts 5a such that the rotational free ends face each other. The inner guide pieces 5b are held at their initial positions at which the rotational free ends of the inner guide pieces 5b are positioned further to the second connecting component 4 side than at regulating positions in the connecting direction of the second connecting component 4. Furthermore, the inner guide pieces 5b are rotated about the rotational shafts 5a from the initial positions to the regulating positions in the connecting direction when the inner guide pieces 5b are brought into contact with the second connecting component 4. The outer guide pieces 5c extend in the radial directions of the pair of rotational shafts 5a. The outer guide pieces 5c are held at their initial positions at which rotational free ends of the outer guide pieces 5c are positioned further to the outside than at regulating positions in an intersecting direction intersecting the connecting direction of the second connecting component 4. The outer guide pieces 5c are rotated about the rotational shafts 5a from the initial positions to the regulating positions in the intersecting direction such that the rotation of the outer guide pieces 5c are coupled with the rotation of the inner guide pieces 5b.

In such a technical structure, the shapes of the first connecting component 2 and the second connecting component 4 are typically rectangular shapes in section. Alternatively, the first connecting component 2 and the second connecting component 4 may have, for example, trapezoidal, circular, or other shapes in section. Furthermore, regarding the first connecting component 2 and the second connecting component 4, the second connecting component 4 is not necessarily moved to the first connecting component 2 side. It is sufficient that either the first connecting component 2 or the second connecting component 4 be moved toward the other. Representative examples of such a first connecting component 2 and a second connecting component 4 include connectors for electrical wiring. Furthermore, the urging members 6 urge the guide member 5 through a holding member 7 (see FIGS. 1A and 1B) by which the rotational shafts 5a are usually rotatably held.

It is sufficient that the guide member 5 at least have a pair of guide pieces (one of the inner guide pieces 5b and one of the outer guide pieces 5c). However, from the viewpoint of further improvement of guiding accuracy, the guide member 5 may include additional guide pieces oriented in different directions (the other of the inner guide pieces 5b and the other of the outer guide pieces 5c) or auxiliary guide pieces (provided in a secured manner) may be additionally provided according to need. The inner guide pieces 5b as described above may correct inclination of the orientation of the second connecting component 4, and the outer guide pieces 5c may position the second connecting component 4 at the connectable position.

Next, representative and other forms used in the description of the outline of the present exemplary embodiment are further described.

From the viewpoint of stabilizing coupled operations of the inner guide pieces 5b and the outer guide pieces 5c, each of the inner guide pieces 5b and a corresponding one of the outer guide pieces 5c may extend in the radial directions from the same region of a corresponding one of the rotational shafts 5a in the axial direction in the guide member 5. Here, regarding the same region, the inner guide piece 5b and the outer guide piece 5c may have the same length in the axial direction, or may be configured such that, for example, the length of one of the regions in the axial direction is greater than the length of the other region defined within the one region. With the inner guide piece 5b and the outer guide piece 5c provided in the same region as described above, the coupled operations of the inner guide piece 5b and the outer guide piece 5c may be stabilized.

Furthermore, as another representative form of the guide member 5, the guide member 5 may include rotational urging members (not illustrated), inner regulating members (not illustrated), and outer regulating members (not illustrated). The rotational urging members are provided around the rotational shafts 5a so as to cause both the inner guide pieces 5b and the outer guide pieces 5c to receive urging forces about the rotational shafts 5a directed from the respective regulating positions to the respective initial positions. The inner guide pieces 5b are brought into contact with and stopped by the inner regulating members at the regulating positions in the connecting direction. The outer guide pieces 5c are brought into contact with and stopped by the outer regulating members at the regulating positions in the intersecting direction.

Here, the inner regulating members may be provided, for example, in the holding member 7, by which the rotational shafts 5a are held, or in the first support member 1. Furthermore, the first connecting component 2 may be utilized. Regarding a representative form of the outer guide pieces 5c, the guide member 5 may include the outer regulating members (not illustrated) that regulate the outer guide pieces 5c so that the outer guide pieces 5c are not inclined from the initial positions toward the first support member 1 side in the guide member 5. Examples of the representative form of such outer regulating members include stoppers provided between the outer guide pieces 5c and the holding member 7. Furthermore, a method of holding the inner guide pieces 5b at the initial positions is not particularly limited. Urging forces that pull the inner guide pieces 5b toward the second connecting component 4 side may be applied, or urging forces that pulls the outer guide pieces 5c toward the first support member 1 side may be applied. These urging forces are realized by the rotational urging members.

Furthermore, according to another form of the guide member 5, the lengths of the outer guide pieces 5c may be greater than the lengths of the inner guide pieces 5b in the radial directions of the rotational shafts 5a. With the outer guide pieces 5c having a long length, misalignment of the first connecting component 2 in the intersecting direction intersecting the connecting direction may be absorbed in a large range. In contrast, with the inner guide pieces 5b having a long length, connecting operation of the connecting components may be obstructed. Thus, the lengths of the inner guide pieces 5b may be determined within a range in which the connecting operation of the connecting components is not obstructed.

Furthermore, the coupling structure for a connecting component using the above-described guide mechanism includes the first connecting component 2, the second connecting component 4, and the guide mechanism. The first connecting component 2 is provided in the first support member 1 in a secured manner. The second connecting component 4 is floatably provided in the second support member 3. The guide mechanism guides the second connecting component 4 to the position where the second connecting component 4 is connectable to the first connecting component 2. This guide mechanism may be the above-described guide mechanism. An object for which such a coupling structure for a connecting component is used is not necessarily an image forming apparatus. The target may be a processing apparatus as long as the first connecting component 2 provided in the first support member 1 in a secured manner and the second connecting component 4 floatably provided in the second support member 3 are detachably attached to each other in the processing apparatus.

The processing apparatus using the above-described guide mechanism may be structured as follows: the processing apparatus includes a processing unit disposed in an apparatus body; one of the first connecting component 2 and the second connecting component 4 is provided in a detachable body that is at least part of the processing unit and detachably attached to a receiving member prepared in the apparatus body; the other of the first connecting component 2 and the second connecting component 4 is provided in the receiving member; and the above-described guide mechanism for a connecting component may be used as a guide mechanism for the first connecting component 2 and the second connecting component 4. Although the processing apparatus is not particularly limited here, representative examples of the processing apparatus include the image forming apparatus. When the processing apparatus is the image forming apparatus, it is sufficient that the detachable body be detachably attached to the apparatus body of the image forming apparatus. Examples of the detachable body include, for example, part of a fixing device, part of a transport system for a recording medium, an image forming part, and so forth.

The exemplary embodiment of the present invention will be described in more detail below with reference to the drawings.

The Exemplary Embodiment

Figure 2:
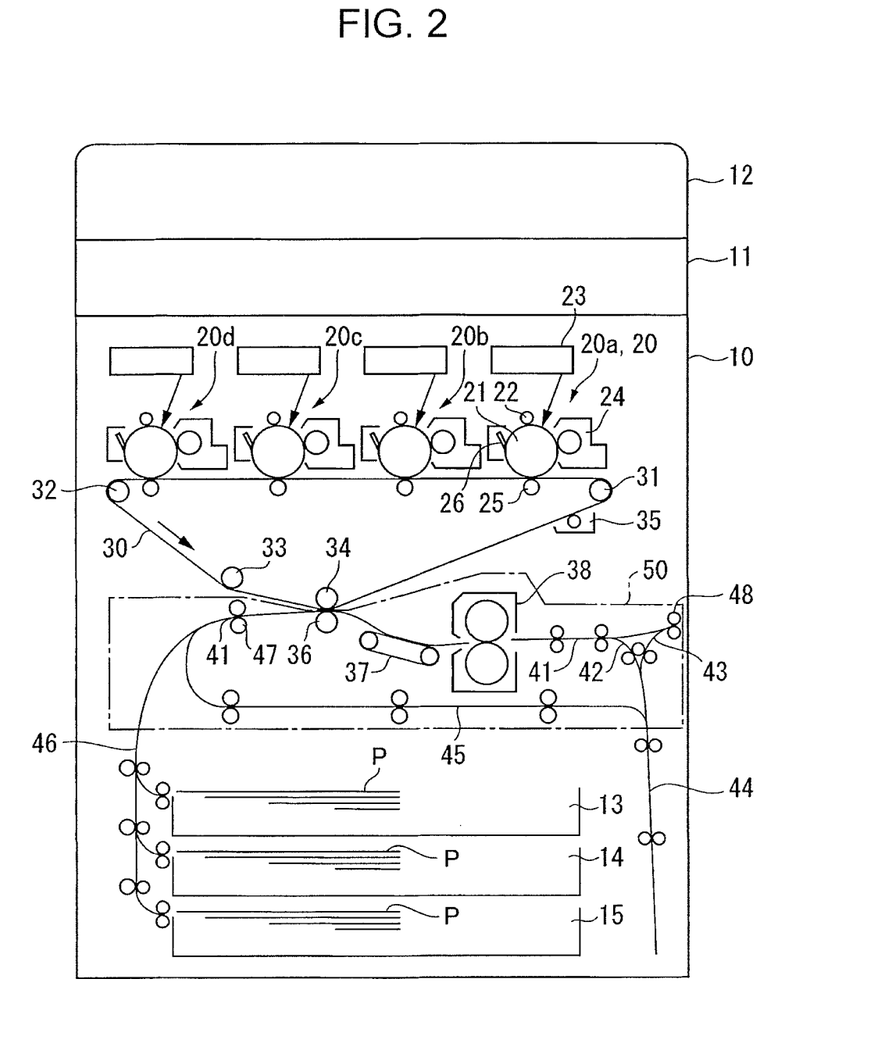
FIG. 2 is an explanatory view of an outline of an image forming apparatus according to the exemplary embodiment of the present invention.

FIG. 2 is an explanatory view of an outline of the exemplary embodiment of an image forming apparatus as a processing apparatus to which the exemplary embodiment of the present invention is applied. Referring to FIG. 2, the image forming apparatus according to the present exemplary embodiment is a color printer that uses developers of four colors. The image forming apparatus includes an apparatus body 10, a document reader 11, and an automatic document feeder 12. The apparatus body 10 forms images on recording media P. The document reader 11 reads a document. The automatic document feeder 12 automatically feeds the document. The document reader 11 and the automatic document feeder 12 are disposed above the apparatus body 10.

Image forming sections 20 (20a to 20d) for the four colors are disposed in a row in the substantially horizontal direction in the apparatus body 10. An endless intermediate transfer belt 30 is looped over stretching rollers below the image forming sections 20. In a present example, four stretching rollers 31 to 34 are provided. Furthermore, recording medium feed units 13 to 15 are provided on the lower side of the apparatus body 10. With the recording medium feed units 13 to 15 of the present example, three stacks of the recording media P are able to be fed.

Since the image forming sections 20a to 20d for the respective colors are structured in the same or similar manner, the image forming section 20a, which is one of the image forming sections 20a to 20d, is described here as a representative of the image forming sections 20a to 20d. The image forming sections 20 each include a photosensitive body 21. Various members for image formation are disposed around the image forming section 20. The photosensitive body 21 includes a photosensitive layer on its surface and capable of holding an electrostatic latent image. The various members provided around the photosensitive body 21 are as follows: a charger 22, a light exposure device 23, a developing device 24, a first transfer device 25, a cleaner 26, and so forth. The charger 22 charges the photosensitive body 21. The charged photosensitive body 21 is exposed to light from the light exposure device 23 so as to form the electrostatic latent image. The developing device 24 develops the electrostatic latent image on the photosensitive body 21. The first transfer device 25 transfers a toner image on the photosensitive body 21 formed through the development onto the intermediate transfer belt 30 through first transfer. The cleaner 26 removes residual matter on the photosensitive body 21 after transfer.

According to the present exemplary embodiment, the light exposure device 23 is provided in each of four image forming sections 20a to 20d. Each of the photosensitive bodies 21 are exposed to laser light in a separated manner by using a polygon mirror, a lens, etc. However, this form is not limiting. The image forming sections 20a to 20d may be exposed to light radiated from a single light exposure device. Alternatively, the exposure device 23 may utilize, for example, light emitting diodes (LEDs).

The intermediate transfer belt 30 is rotated in an arrow direction of FIG. 2 by, for example, the stretching roller 32 serving as a drive roller out of four stretching rollers 31 to 34. A second transfer device 36 is provided at a position facing the stretching roller 34 with the intermediate transfer belt 30 interposed therebetween. The second transfer device 36 collectively transfers toner images on the intermediate transfer belt 30 onto each of the recording media P fed from the recording medium feed units 13 to 15. Toner images transferred from the image forming sections 20a to 20d through the first transfer become superposed multiple toner images on the transfer belt 30, and the superposed multiple toner images are collectively transferred onto the recording medium P with the stretching roller 34 serving as a backup roller. Furthermore, a belt cleaner 35 is provided so as to remove residual toner from the intermediate transfer belt 30 in a region between the stretching rollers 34 and 31 after the collective transfer has been performed.

Furthermore, a registration roller 47, a belt-type transport roller 37, and a fixing device 38 are provided. The registration roller 47 disposed next to the second transfer device 36 on the upstream side positions and feeds the recording medium P fed from any one of the recording medium feed units 13 to 15. The transport roller 37 provided downstream of the second transfer device 36 transports the recording medium P on which the collective transfer has been performed. The fixing device 38 fixes the toner images having been collectively transferred onto the recording medium P.

A flow of the recording medium P according to the present exemplary embodiment is as follows: That is, the recording medium P fed from any one of the recording medium feed units 13 to 15 reaches a transport path 41 through a feed transport path 46 and then reaches the fixing device 38 through the registration roller 47 and a collective transfer part (part of the second transfer device 36). The recording medium P having undergone fixing by the fixing device 38 passes through the transport path 41 without being processed and is output to the outside of the apparatus body 10 through an output roller 48. In order to form images on the back side of the recording medium P, the recording medium P having undergone the fixing is transported from the transport path 41 to an inversion transport path 44 through a branch path 42. Then, the recording medium P is introduced again to the registration roller 47 through a return transport path 45. Furthermore, in order to simply invert and output the recording medium P having undergone the fixing, the recording medium P is introduced to the inversion transport path 44 and then introduced to the output roller 48 through a return branch path 43. Of course, these transport paths are appropriately provided with transport rollers, switching claws, guides, and so forth for transportation of the recording medium P.

According to the present exemplary embodiment, a portion surrounded by a dotted chain line illustrated in FIG. 2 is a drawable unit 50 serving as the detachable body detachably attached to the apparatus body 10. The drawable unit 50 according to the present exemplary embodiment includes part of the feed transport path 46, the transport path 41, the branch path 42, the return branch path 43, and the return transport path 45. The drawable unit 50 further includes the registration roller 47, the second transfer device 36, the belt-type transport roller 37, the fixing device 38, and so forth. Thus, with the present example, by drawing out the drawable unit 50 from the apparatus body 10, for example, problems such as jamming of the recording medium P are easily visually recognized. Of course, the receiving member to which the drawable unit 50 is attached is provided on the apparatus body 10 side.

In order to realize such a drawable unit 50, electrical connection is required between the drawable unit 50 and the apparatus body 10. When the drawable unit 50 is drawn from the apparatus body 10, an operator is able to safely perform maintenance work or the like by disconnecting the connection of the drawable unit 50 and the apparatus body 10 to each other. According to the present exemplary embodiment, connectors that serve as the connecting components and provided in both the drawable unit 50 and the apparatus body 10 are to be coupled with each other.

Usually, in order to couple (connect) such separated two connectors with each other, one of the connectors is provided on the apparatus body 10 side and the other connector is provided on the drawable unit 50 side. The connector on the apparatus body 10 side is secured to a frame of the apparatus body 10 and the connector of the drawable unit 50 is supported in a floating state relative to a frame of the drawable unit 50 so as to connect both the connectors to each other. However, in order to connect both the connector to each other, high dimensional accuracy at portions where these connectors are disposed is required. Thus, it is required that various components be manufactured to exacting tolerances. Furthermore, adjustment work is required in various steps of the assembly of the image forming apparatus. These require a large amount of work. With a view to these points, the connectors are connected as follows according to the present exemplary embodiment.

Figure 3:
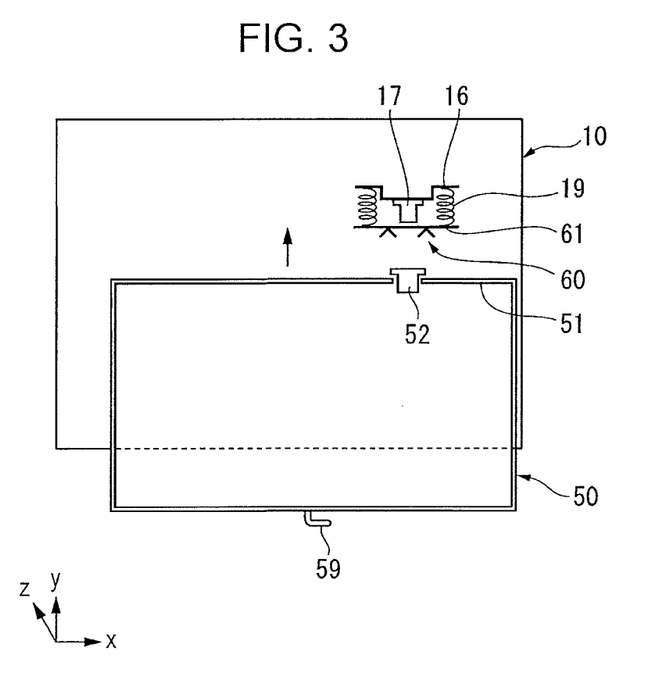
FIG. 3 illustrates a state of a drawable unit and an apparatus body during attachment of the drawable unit to the apparatus body according to the exemplary embodiment.

FIG. 3 illustrates a state of the drawable unit 50 and the apparatus body 10 during connection of the drawable unit 50 to the apparatus body 10 in the y direction according to the present exemplary embodiment. According to the present exemplary embodiment, in order to reduce the cumbersome work as described above, the following guide mechanism is used. That is, the guide mechanism for a connecting component guides a drawable connector 52 to a position where the drawable connector 52 is connectable to a body connector 17 when connecting the body connector 17 and the drawable connector 52 to each other. The body connector 17 serves as the first connecting component and is provided in a body frame 16 on the apparatus body 10 side, in a secured manner. The apparatus body serves as the first support member. The drawable connector 52 serves as the second connecting component floatably provided in a drawable frame 51 on the drawable unit 50 side. The drawable unit 50 serves as the second support member. The guide mechanism includes a guide member 60 and coil springs 19. The guide member 60 is disposed in front of a connection start position of the body connector 17. The coil springs 19 serve as the urging members elastically deformably provided between the guide member 60 and the body frame 16, urge the guide member 60 in a direction separating from the body connector 17 so as to dispose the guide member 60 in front of the connection start position, and continue to contract until the drawable connector 52 reaches a connection complete position.

Here, reference sign 61 of FIG. 3 denotes the holding member that holds the guide member 60. The holding member 61 is coupled with the body frame 16 by the coil springs 19. Reference sign 59 of FIG. 3 denotes a handle used to attach or detach the drawable unit 50 to or from the apparatus body 10. In the present example, the second transfer device 36 is separated from the intermediate transfer belt 30 by operating the handle 59 so as not to obstruct a drawing operation of the drawable unit 50. Of course, a guide rail and the like are provided on the apparatus body 10 side so as to facilitate the drawing operation of the drawable unit 50.

Figure 4A:
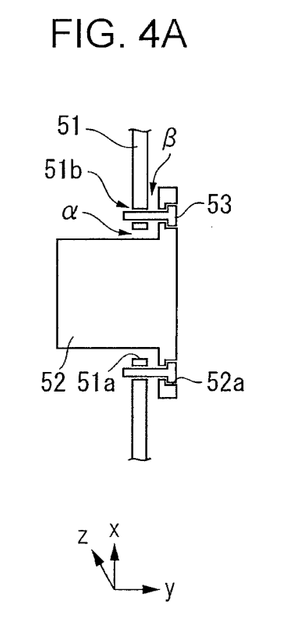
FIG. 4A is an explanatory view of the relationship between a drawable connector and a drawable frame according to the exemplary embodiment.
Figure 4B:
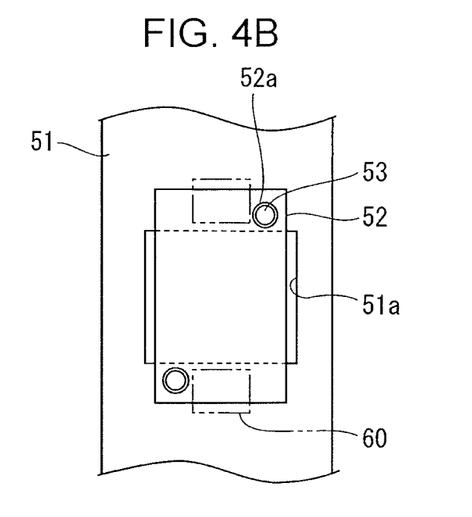
FIG. 4B illustrates the structure of FIG. 4A seen in the y direction.

The drawable connector 52 according to the present exemplary embodiment is, as illustrated in FIGS. 4A and 4B, inserted into a hole 51a formed at part of the drawable frame 51 with a space set between the drawable connector 52 and the drawable frame 51. The drawable connector 52 is supported at the drawable frame 51 by screws 53 or the like between two holes 51b formed in the drawable frame 51 and two holes 52a formed in the drawable connector 52. At this time, the drawable frame 51 and the drawable connector 52 are secured to each other with a gap β formed therebetween in the y direction of FIG. 4A. In order to secure the screws 53 and the drawable frame 51 to one another, for example, an adhesive may be used, or, for example, the holes 51b of the drawable frame 51 may be burred and thread grooves may be formed at the burred portions. Alternatively, another known method may be used. FIG. 4B illustrates the structure of FIG. 4A seen in the y direction. Two-dot chain lines of FIG. 4B indicate the positions of the guide member 60 before the drawable connector 52 is attached to the body connector 17.

Thus, a gap α and the gap β are respectively formed between the drawable connector 52 and the drawable frame 51 in the x direction and y direction (direction in which the drawable unit 50 is attached) of FIG. 4A according to the present exemplary embodiment. This sets the drawable connector 52 in a so-called floating state in which the drawable connector 52 is floatable relative to the drawable frame 51. Although the dimension of the holes 52a of the drawable connector 52 and the dimension of the screws 53 in the present example are only slightly different, this dimensional difference may be increased.

Figure 5A:
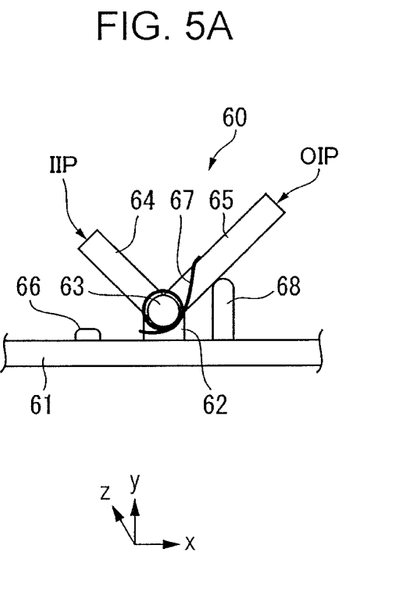
FIG. 5A is an explanatory view of one of two parts of a guide member according to the exemplary embodiment.
Figure 5B:
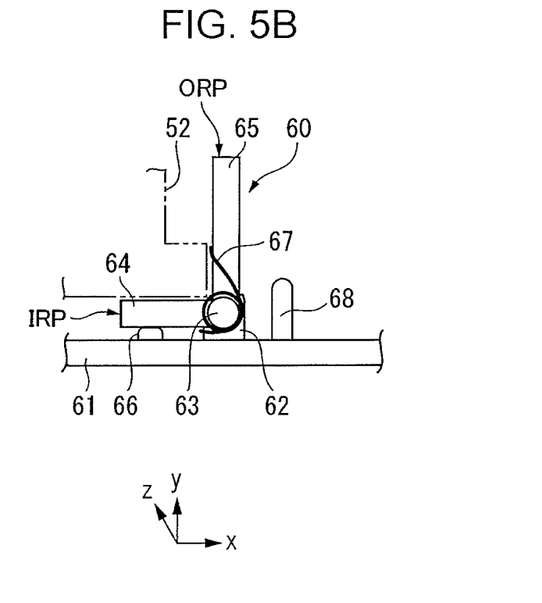
FIG. 5B is an explanatory view of a state in which the drawable connector is guided by the guide member.
Figure 5C:
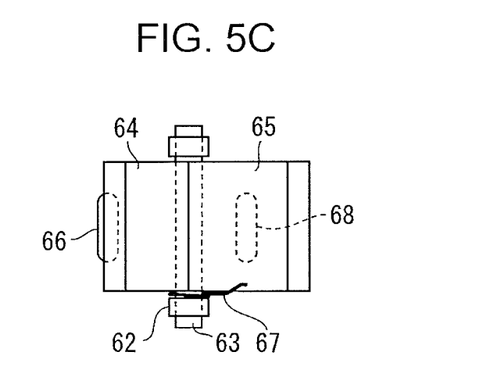
FIG. 5C is an explanatory view of the structure of FIG. 5A seen from above in the y direction.

FIGS. 5A to 5C are explanatory views illustrating one of two parts of the guide member 60 according to the present exemplary embodiment. Specifically, FIG. 5A illustrates an initial state, FIG. 5B illustrates a state in which the drawable connector 52 is connected to the body connector 17, and FIG. 5C illustrates the structure of FIG. 5A seen from above.

The guide member 60 includes rotational shafts 63, inner guide pieces 64, and outer guide pieces 65. Rotational shafts 63 are provided on both sides of the guide member 60 in a direction intersecting a connecting direction of the drawable connector 52, thereby consisting at least a pair of the rotational shafts 63. The inner guide pieces 64 have respective rotational free ends and extend in the radial directions of the pair of rotational shafts 63 such that the rotational free ends face each other. The inner guide pieces 64 are held at their initial positions IIP at which the rotational free ends of the inner guide pieces 64 are positioned further to the drawable connector 52 side than at regulating positions IRP in the connecting direction (y direction) of the drawable connector 52. Furthermore, the inner guide pieces 64 are rotated about the rotational shafts 63 from the initial positions IIP to the regulating positions IRP in the connecting direction when the inner guide pieces 64 are brought into contact with the drawable connector 52. The outer guide pieces 65 extend in the radial directions of the pair of rotational shafts 63. The outer guide pieces 65 are held at their initial positions OIP where rotational free ends of the outer guide pieces 65 are positioned further to the outside than at regulating positions ORP in the intersecting direction (x direction) intersecting the connecting direction of the drawable connector 52. The outer guide pieces 65 are rotated about the rotational shafts 63 from the initial positions OIP to the regulating positions ORP in the intersecting direction such that the rotation of the outer guide pieces 65 are coupled with the rotation of the inner guide pieces 64.

Furthermore, the guide member 60 according to the present exemplary embodiment includes torsion springs 67, inner stoppers 66, and outer stoppers 68. The torsion springs 67 serving as the rotational urging members are provided around the rotational shafts 63 so as to cause both the inner guide pieces 64 and the outer guide pieces 65 to receive urging forces about the rotational shafts 63 directed from the respective regulating positions IRP and ORP to the respective initial positions IIP and OIP. The inner guide pieces 64 are brought into contact with and stopped by the inner stoppers 66 serving as the inner regulating members at the regulating positions IRP in the connecting direction (y direction). The outer guide pieces 65 are brought into contact with and stopped by the outer stoppers 68 serving as the outer regulating members at the regulating positions ORP in the intersecting direction (x direction).

According to the present exemplary embodiment, each of the inner guide pieces 64 and the corresponding one of the outer guide pieces 65 are integrally formed as a single component and extend from the same region in the axial direction of a corresponding one of the rotational shafts 63 so as to facilitate the coupled operation. Furthermore, the rotational shafts 63 are rotatable with respect to support bars 62 that project from the holding member 61 in the y direction. Furthermore, the torsion springs 67 are attached to the rotational shafts 63. One end of each of the torsion springs 67 is hooked onto the support bar 62 and the other end is hooked onto the outer guide piece 65. The urging forces (corresponding to rotational urging forces) that pull the rotational free end side of the outer guide pieces 65 to the holding member 61 side are applied by the torsion springs 67.

Furthermore, in the present example, an angle formed between each of the inner guide pieces 64 and a corresponding one of the outer guide pieces 65 is about 90° that follows the external shape of the drawable connector 52. Angles of the inner guide pieces 64 and the outer guide pieces 65 relative to the y direction are about 45°. Furthermore, the outer guide pieces 65 are slightly longer than the inner guide pieces 64.

The inner stoppers 66 and the outer stoppers 68 are provided on the holding member 61 according to the present exemplary embodiment. The inner stoppers 66 regulate the inner guide pieces 64 at the regulating positions IRP. The outer stoppers 68 regulate the outer guide pieces 65 so that the outer guide pieces 65 are not inclined from the initial positions OIP to the holding member 61 side. Thus, the initial positions IIP and OIP of the inner guide pieces 64 and the outer guide pieces 65 may be stabilized by a combined effect of the outer stoppers 68 and the rotational urging forces of the torsion springs 67. Furthermore, the regulating positions IRP and ORP of the inner guide pieces 64 and the outer guide pieces 65 may be stabilized by the inner stoppers 66. Of course, the rotational urging forces of the torsion springs 67 are not so large. Thus, the rotational urging forces are unlikely to pull back the drawable unit 50, and accordingly, the attaching and detaching operations of the drawable unit 50 are not obstructed. Although the rotational urging forces are applied by the torsion springs 67 in the present example, the rotational urging forces are not necessarily applied by the torsion springs 67. For example, flat springs or the like may instead be used.

Figure 6A:
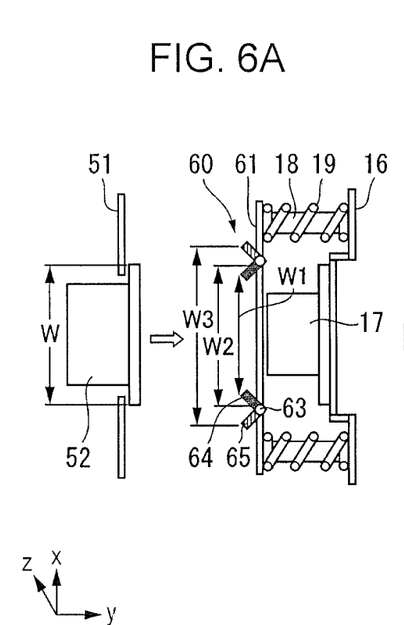
Figure 6B:
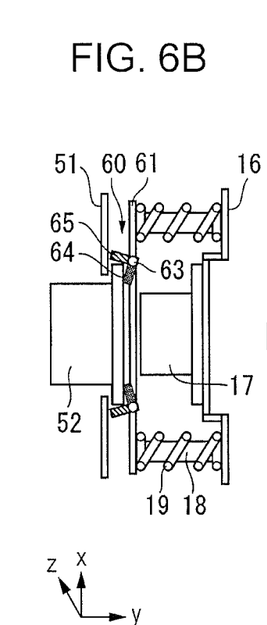
Figure 6C:
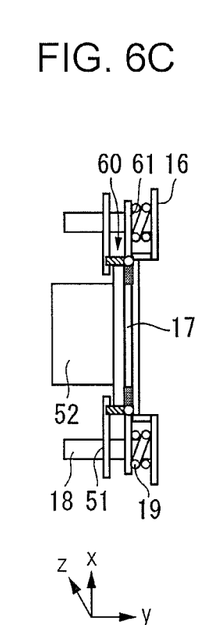

Next, the connecting operation of the drawable connector 52 to the body connector 17 according to the present exemplary embodiment is described. FIGS. 6A to 6C illustrate changes during the connecting operation. Specifically, FIG. 6A illustrates a stage before the drawable connector 52 is brought into contact with the guide member 60 before the connection, FIG. 6B illustrates a stage at which the drawable connector 52 is brought into contact with the guide member 60, and FIG. 6C illustrates a stage at which the drawable connector 52 is connected to the body connector 17.

Here, although it is not illustrated in FIG. 3, slide shafts 18 are provided at the centers of the coil springs 19 between the body frame 16 and the holding member 61. The slide shafts 18 slide as the coil springs 19 extend or contract. Holes corresponding to the slide shafts 18 are formed on the holding member 61 side. Thus, bending of the coil springs 19 is suppressed during extension and contraction of the coil springs 19. Furthermore, a relief for the slide shafts 18 is provided when the coil springs 19 contract. Thus, the holding member 61 is allowed to move close to the body frame 16.

Referring to FIGS. 6A to 6C, initially, in a state illustrated in FIG. 6A, the coil springs 19 are maintained in an extended state (contract from the free length by a length corresponding to load) between the body frame 16 and the holding member 61. Thus, the holding member 61 that holds the guide member 60 projects to the drawable connector 52 side. In this state, the holding member 61 is positioned so as to project further to the drawable connector 52 side than a connection start position of the body connector 17 (corresponding to an end position of the body connector 17 on the drawable connector 52 side in FIGS. 6A to 6C). Furthermore, the guide member 60 is still maintained in an initial state (see FIG. 5A).

The dimensional relationships between the drawable connector 52 and the guide member 60 in the x direction in FIG. 6A are as follows.

That is, as illustrated in FIG. 6A, in the guide member 60 including the paired structures, when the width of the drawable connector 52 is w, the distance between the inner guide pieces 64 is w1, the distance between the rotational shafts 63 is w2, and the distance between the outer guide pieces 65 is w3, the following relationships are satisfied according to the present exemplary embodiment:

$$w > w1, w \leq w2, \text{ and } w \leq w3.$$

This may stabilize an operation of the guide member 60 when the drawable connector 52 is brought into contact with the guide member 60.

Next, when the drawable connector 52 is moved close to the body connector 17, a state as illustrated in FIG. 6B is assumed. In this state, regarding the position of the drawable connector 52 relative to the body connector 17, in the case where misalignment in the x direction is little, the drawable connector 52 is initially brought into contact with the inner guide pieces 64 and then causes the outer guide pieces 65 to rotate to the drawable connector 52 side when the drawable connector 52 is brought into contact with the guide member 60 as illustrated in FIG. 6B.

Furthermore, when the drawable connector 52 is pushed in the y direction due to the attaching operation of the drawable unit 50, the inner guide pieces 64 in contact with the drawable connector 52 are further pushed and brought into contact with the inner stoppers (not illustrated). Thus, the inner guide pieces 64 reach the regulating positions IRP (see FIG. 5B). With this movement of the inner guide pieces 64, the outer guide pieces 65 also reach the regulating positions ORP (see FIG. 5B). In this state, the drawable connector 52 is at a position where the drawable connector 52 is connectable to the body connector 17. Then, as illustrated in FIG. 6C, the drawable connector 52 is connected to the body connector 17 while the coil springs 19 are contracting, thereby establishing electrical connection of the drawable connector 52 and the body connector 17 to each other. In this state, since the coil springs 19 contract along the slide shafts 18, the connection of the drawable connector 52 to the body connector 17 may be stably performed.

Furthermore, the drawable connector 52 is in a floating state relative to the drawable frame 51. Thus, even in the case where, for example in FIG. 6A, the drawable connector 52 is slightly misaligned with the body connector 17 in the x direction, the position of the drawable connector 52 in the x direction is corrected through contact of the drawable connector 52 with the guide member 60 (specifically, the inner guide pieces 64 and the outer guide pieces 65). Thus, since the drawable connector 52 is in contact with the body connector 17 with the position thereof corrected relative to the body connector 17, the drawable connector 52 is connected to the body connector 17.

In particular, according to the present exemplary embodiment, the lengths (lengths in the radial directions of the rotational shafts 63) of the outer guide pieces 65 are set to be greater than the lengths of the inner guide pieces 64 in the guide member 60. This increases the likelihood of the drawable connector 52 being brought into contact with the outer guide pieces 65 even in the case where, for example, the misalignment of the drawable connector 52 relative to the body connector 17 in the x direction is large. Thus, the misalignment may be absorbed in a large region correspondingly.

By inserting the drawable unit 50 into the apparatus body 10 as described above, the body connector 17 and the drawable connector 52 are connected to each other. In order to draw out the drawable unit 50 from the apparatus body 10, the connection of the body connector 17 and the drawable connector 52 to each other is released from each other by the operation performed in reverse order to the operation in which the body connector 17 and the drawable connector 52 are connected to each other. At this time, the guide member 60 is also gradually returned to the initial state (orientation) by following the movement of the drawable connector 52. Then, the drawable unit 50 may be used for the next attaching operation.

Here, assuming that the drawable connector 52 is brought into contact with the guide member 60 while the drawable connector 52 is inclined relatively to the y direction, a form including the guide member 60 as used in the present exemplary embodiment and a form including a secured guide that includes only portions corresponding to the outer guide pieces 65 are compared in the following description.

Figure 7A:
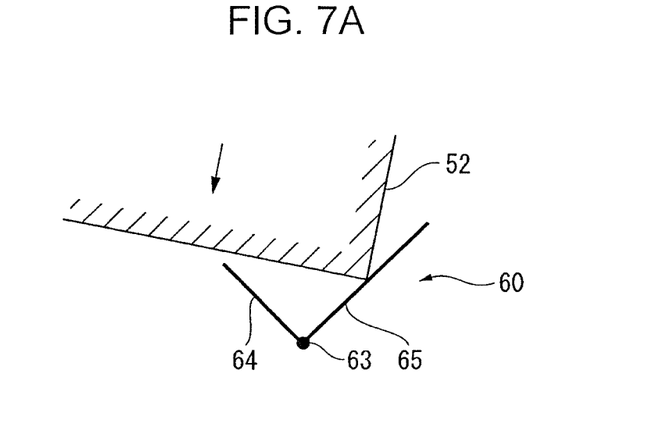
FIG. 7A is an explanatory view of a form including the guide member according to the exemplary embodiment.
Figure 7B:
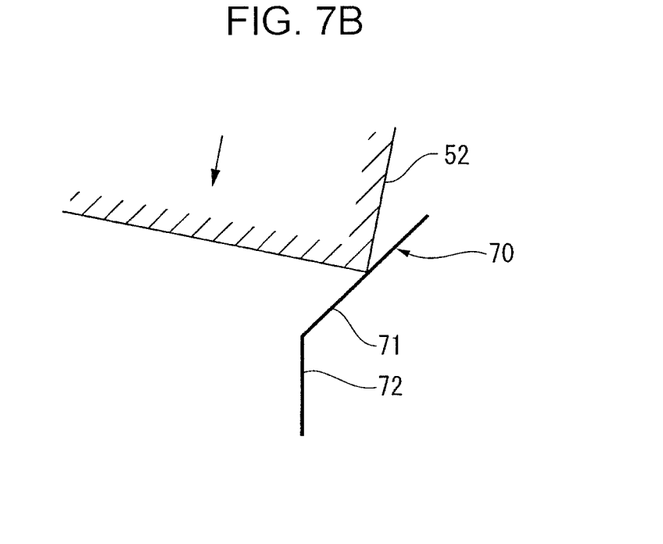
FIG. 7B illustrates a form including a secured guide as a comparative example.

FIG. 7A illustrates a form including the guide member 60 according to the present exemplary embodiment, and FIG. 7B illustrates a form including a secured guide 70 as a comparative example.

Initially, with the comparative example as illustrated in FIG. 7B, when the drawable connector 52 is brought into contact with a inclined portion 71 of the secured guide 70 in an inclined direction, the drawable connector 52 does not reach a vertical portion 72 disposed below the position where the drawable connector 52 is brought into contact with the inclined portion 71 and is likely to continue to bite the inclined portion 71 because the secured guide 70 itself is secured. Thus, the drawable connector 52 may be attached to the body connector 17 in an inclined direction. This may lead to problems such as damage to components and the like. Furthermore, there may be a need of fine adjustment for connecting the drawable connector 52 and the body connector 17 to each other.

In contrast, according to the present exemplary embodiment, even when the drawable connector 52 is brought into contact with one of the outer guide pieces 65 of the guide member 60 as illustrated in FIG. 7A, the drawable connector 52 is soon brought into contact with a corresponding one of the inner guide pieces 64, and accordingly, pushes the inner guide piece 64 downward. As a result, the inclination angle of the outer guide piece 65 is quickly changed, thereby increasing ease of a downward movement of the drawable connector 52. This may stabilize the connecting operation.

In order to connect the drawable connector 52 to the body connector 17 as described above, a certain degree of accuracy is required for the dimensions of the body connector 17 and the drawable connector 52 relating to positioning. The dimensional accuracy of the members of the body connector 17 and the drawable connector 52 themselves is ensured to some degree. However, when attaching the body connector 17 and the drawable connector 52 respectively to the apparatus body 10 and the drawable unit 50, there may be a large deviation in dimension depending on dimensional accuracy and attachment accuracy of various members. That is, there may be a deviation of about a few mm at a connecting position where the body connector 17 and the drawable connector 52 are connected to each other depending on dimensional accuracy, assembly accuracy, and the like of the members to which the connectors are attached. In order to reduce such deviation, more detailed accuracy control and more detailed adjustment in assembly are required. However, by adopting the structure as used in the present exemplary embodiment, the accuracy control may be relaxed. It has been confirmed that, according to the present exemplary embodiment, even when misalignment of the drawable connector 52 with the body connector 17 in the x direction is about 2 mm at the maximum, the drawable connector 52 is satisfactorily attached to and detached from the body connector 17.

Although the outer guide pieces 65 are longer than the inner guide pieces 64 in the guide member 60 according to the present exemplary embodiment, this does not limit the relationship between the lengths of the inner guide pieces 64 and the lengths of the outer guide pieces 65. The lengths of the inner guide pieces 64 and the outer guide pieces 65 may be substantially the same, or the inner guide pieces 64 may be longer than the outer guide pieces 65. It is sufficient that the lengths of the inner guide pieces 64 in particular out of the inner guide pieces 64 and the outer guide pieces 65 do not affect the body connector 17 and the drawable connector 52 when the drawable connector 52 is attached to the body connector 17.

Although the angle formed between each of the inner guide pieces 64 and a corresponding one of the outer guide pieces 65 is about 90°, and angles of the inner guide pieces 64 and the outer guide pieces 65 relative to the y direction are about 45° in the present example, these are not limiting. It is sufficient that angles at which the inner guide pieces 64 and the outer guide pieces 65 are provided do not obstruct the operation of the guide member 60.

According to the present exemplary embodiment, the body connector 17 provided as the connecting component on the apparatus body 10 side is secured and the drawable connector 52 on the drawable unit 50 side is set in the floating state. However, this is not limiting. The same or similar effects are produced also by a form in which the body connector 17 is set in the floating state and the drawable connector 52 is secured. Of course, the guide member 60 is provided on the drawable connector 52 side in this structure.

Furthermore, according to the present exemplary embodiment, the guide mechanism that guides one of the connectors as the connecting component between the apparatus body 10 and the drawable unit 50 of the image forming apparatus is described. However, a similar structure may be used in the case such as a case where, for example, a retrofit component is connected. Furthermore, the similar structure may be applied to other apparatuses serving as processing apparatuses that include processing units. According to the present exemplary embodiment, each of the inner guide pieces 64 and a corresponding one of the outer guide pieces 65 are integrally formed in the guide member 60. However, the inner guide piece 64 and the outer guide piece 65 may be separately formed.

Figure 8A:
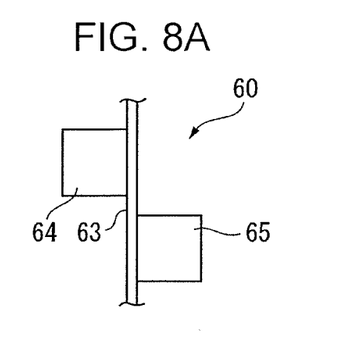
FIGS. 8A to 8C illustrate variations of the guide member each seen from above in the y direction of FIGS. 6A to 6C.
Figure 8B:
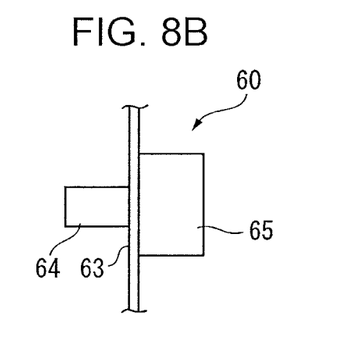
Figure 8C:
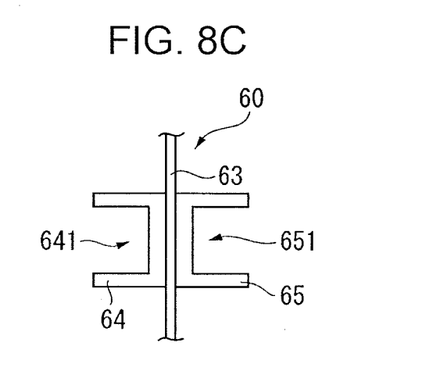

FIGS. 8A to 8C illustrate variations of the guide member 60 each seen from above (corresponding to the upper side in the y direction of FIGS. 6A to 6C).

FIG. 8A illustrates a form in which the inner guide pieces 64 and the outer guide pieces 65 of the guide member 60 extend in the radial directions from different regions in the axial direction of the rotational shafts 63 instead of extending from the same region in the axial direction of the rotational shafts 63. With such a form, the drawable connector 52 is sufficiently guided as is the case with the above-described exemplary embodiment.

Referring to FIG. 8B, the lengths of the inner guide pieces 64 and the outer guide pieces 65 of the guide member 60 in the axial direction along the rotational shafts 63 are different from one another. Also with such a form, the effects of the inner guide pieces 64 and the outer guide pieces 65 are the same as those produced by the above-described exemplary embodiment.

Furthermore, referring to FIG. 8C, neither the inner guide pieces 64 nor the outer guide pieces 65 have a rectangular shape. Instead, the inner guide pieces 64 and the outer guide pieces 65 have recesses 641 and 651 in the axial direction of the rotational shafts 63. Thus, by positioning connecting portions of the drawable connector 52 and the body connector 17 at these recesses 641 and 651, effects on the connection on both the connector are reduced and the distance between the tip ends (corresponding to the positions of the rotational free ends) of the inner guide pieces 64 and the rotational shafts 63 and the distance between the tip ends of the outer guide pieces 65 and the rotational shafts 63 may be increased when connecting the body connector 17 and the drawable connector 52 to each other. This allows the position where the drawable connector 52 is brought into contact with the guide member 60 to be closer to the drawable connector 52 side. Thus, the drawable connector 52 may be more quickly guided to an appropriate position.

Figure 9A:
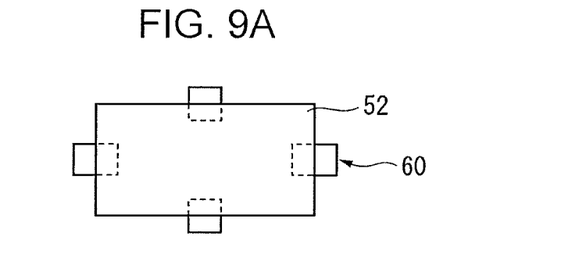
FIGS. 9A to 9C illustrate various shapes of the drawable connector and arrangement of parts of the guide member as the variations.
Figure 9B:
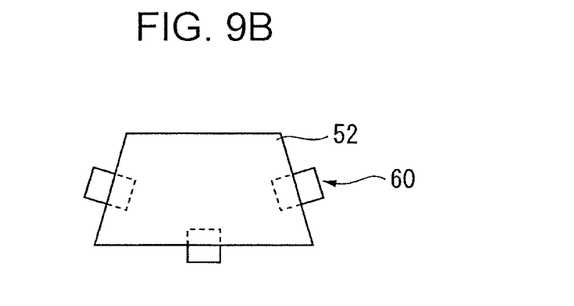
Figure 9C:
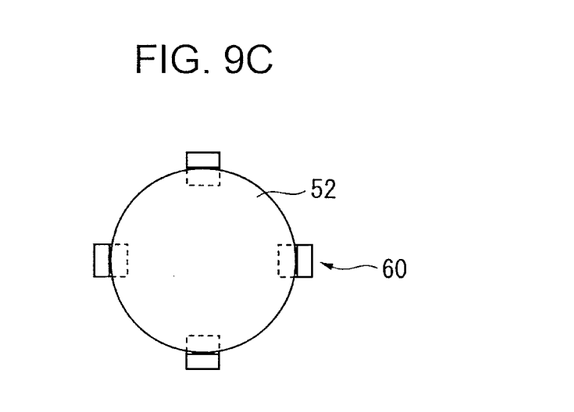

FIGS. 9A to 9C illustrate various shapes of the drawable connector 52 and arrangement of parts of the guide member 60 as the variations. Referring to FIG. 9A, parts of the guide member 60 are disposed at four positions for the rectangular drawable connector 52. With such arrangement, a connecting orientation of the drawable connector 52 may be further stabilized. Referring to FIG. 9B, the parts of the guide member 60 are disposed at three positions for the trapezoidal drawable connector 52. With such arrangement, the connecting orientation of the drawable connector 52 may be further stabilized. Referring to FIG. 9C, the parts of the guide member 60 are disposed at four positions for the circular drawable connector 52. With such arrangement, an attachment orientation of the drawable connector 52 may be further stabilized.

As described above, by arranging the guide member 60 in accordance with the shapes of the connector to which the guide member 60 is applied, connection of the connectors to each other may be further stabilized.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A guide mechanism for a connecting component that guides a second connecting component to a position where the second connecting component is connectable to a first connecting component when connecting the first connecting component provided in a first support member in a secured manner and the second connecting component floatably provided in a second support member to each other, the guide mechanism comprising:
- a guide member disposed in front of a connection start position of the first connecting component; and
- an urging member that is elastically deformably provided between the guide member and the first support member, that urges the guide member in a direction separating from the first connecting component so as to dispose the guide member in front of the connection start position, and that continues to contract until the second connecting component reaches a connection complete position, wherein the guide member includes
- at least a pair of rotational shafts provided on both sides of the second connecting component in a direction intersecting a connecting direction of the second connecting component,
- inner guide pieces that have respective rotational free ends, that extend in radial directions of the at least a pair of rotational shafts such that the rotational free ends face each other, that are held at first initial positions at which the rotational free ends of the inner guide pieces are positioned further to a second connecting component side than at first regulating positions in the connecting direction of the second connecting component, and that are rotated about the at least a pair of rotational shafts from the first initial positions to the first regulating positions in the connecting direction when the inner guide pieces are brought into contact with the second connecting component, and
- outer guide pieces that have respective rotational free ends, that extend in the radial directions of the at least a pair of rotational shafts, that are held at second initial positions at which the rotational free ends of the outer guide pieces are positioned further to outer sides than at second regulating positions in an intersecting direction intersecting the connecting direction of the second connecting component, and that are rotated about the at least a pair of rotational shafts from the second initial positions to the second regulating positions in the intersecting direction such that the rotation of the outer guide pieces is coupled with the rotation of the inner guide pieces.

2. The guide mechanism according to claim 1, wherein each of the inner guide pieces and a corresponding one of the outer guide pieces of the guide member extend in the radial directions from a same region in an axial direction of a corresponding one of the at least a pair of rotational shafts.

3. The guide mechanism according to claim 1, wherein the guide member further includes
- rotational urging members provided around the at least a pair of rotational shafts so as to cause the inner guide pieces and the outer guide pieces to receive urging forces about the at least a pair of rotational shafts directed from the first and second regulating positions to the first and second initial positions,
- inner regulating members that are brought into contact with and stop the inner guide pieces at the first regulating positions in the connecting direction, and
- outer regulating members that are brought into contact with and stop the outer guide pieces at the second regulating positions in the intersecting direction.

4. The guide mechanism according to claim 1, wherein, in the guide member, lengths of the outer guide pieces are greater than lengths of the inner guide pieces in the radial directions of the at least a pair of rotational shafts.

5. A coupling structure for a connecting component, the coupling structure comprising:
- a first connecting component provided in a first support member in a secured manner;
- a second connecting member floatably provided in a second support member; and
- the guide mechanism according to claim 1 that guides the second connecting component to the position where the second connecting component is connectable to the first connecting component.

6. A processing apparatus that includes a processing unit in an apparatus body,
wherein one of a first connecting component and a second connecting component is provided in a detachable body that is at least part of the processing unit and that is detachably attached to a receiving member prepared in the apparatus body, and
wherein the other of the first connecting component and the second connecting component is provided in the receiving member, and the guide mechanism for a connecting component according to claim 1 is used as a guide mechanism for the first connecting component and the second connecting component.

7. A guide mechanism for a connecting component that guides a second connecting component to a position where the second connecting component is connectable to a first connecting component when connecting the first connecting component provided in a first support member in a secured manner and the second connecting component floatably provided in a second support member to each other, the guide mechanism comprising:
- a guide member disposed in front of a connection start position of the first connecting component; and
- an urging member that is elastically deformably provided between the guide member and the first support member, and that is configured to urge the guide member without contacting the first connecting component, wherein the guide member includes:
- at least a pair of rotational shafts provided on both sides of the second connecting component in a direction intersecting a connecting direction of the second connecting component;
- inner guide pieces that have respective rotational free ends, that extend in radial directions of the at least a pair of rotational shafts such that the rotational free ends face each other, that are held at first initial positions at which the rotational free ends of the inner guide pieces are positioned further to a second connecting component side than at first regulating positions in the connecting direction of the second connecting component, and that are rotated about the at least a pair of rotational shafts from the first initial positions to the first regulating positions in the connecting direction when the inner guide pieces are brought into contact with the second connecting component; and
- outer guide pieces that have respective rotational free ends, that extend in the radial directions of the at least a pair of rotational shafts, that are held at second initial positions at which the rotational free ends of the outer guide pieces are positioned further to outer sides than at second regulating positions in an intersecting direction intersecting the connecting direction of the second connecting component, and that are rotated about the at least a pair of rotational shafts from the second initial positions to the second regulating positions in the intersecting direction such that the rotation of the outer guide pieces is coupled with the rotation of the inner guide pieces.

8. A coupling structure for a connecting component, the coupling structure comprising:
 a first connecting component provided in a first support member in a secured manner;
 a second connecting member floatably provided in a second support member; and
 the guide mechanism according to claim 7 that guides the second connecting component to the position where the second connecting component is connectable to the first connecting component.

9. A processing apparatus, the processing apparatus comprising:
 an apparatus body;
 a processing unit within the apparatus body; and
 the guide mechanism according to claim 7,
 wherein a first one of a first connecting component and a second connecting component is provided in a detachable body that is at least part of the processing unit and that is detachably attached to a receiving member prepared in the apparatus body, and
 wherein a second one, other than the first one, of the first connecting component and the second connecting component is provided in the receiving member, and the guide mechanism guides the second connecting component to the position where the second connecting component is connectable to the first connecting component.

* * * * *